United States Patent [19]

Tiep

[11] Patent Number: 4,856,215

[45] Date of Patent: Aug. 15, 1989

[54] SLIDE SORTERS

[76] Inventor: Brian L. Tiep, 632 Norumbega Dr., Monrovia, Calif. 91016

[21] Appl. No.: 331,067

[22] Filed: Mar. 28, 1989

Related U.S. Application Data

[63] Continuation of Ser. No. 44,241, Apr. 30, 1987, abandoned.

[51] Int. Cl.⁴ ............................................. G02B 27/02
[52] U.S. Cl. ......................................... 40/361; 40/366
[58] Field of Search ................ 40/361, 366, 367, 374, 40/375

[56] References Cited

U.S. PATENT DOCUMENTS

| | | | |
|---|---|---|---|
| 479,716 | 7/1892 | Miller | 40/17 |
| 3,410,012 | 11/1968 | Kumei et al. | 40/366 |
| 3,508,355 | 4/1970 | Hooper | 40/366 |
| 3,696,538 | 10/1972 | Nast | 40/361 X |

*Primary Examiner*—Carlton R. Croyle
*Assistant Examiner*—Leonard P. Walnoha
*Attorney, Agent, or Firm*—Price, Gess & Ubell

[57] ABSTRACT

A device useful in sorting slides can be constructed so as to include a tray formed of a white polymer material and so as to include a plurality of slide holders pivotally mounted on the tray generally above the bottom of it so that they may be rotated between storage positions in which slides held by the holders are generally parallel to the bottom of the tray and adjacent to the bottom of the tray to a sorting position in which slides held by the holders are located at an angle to the bottom of the tray. Detents are provided for temporarily positioning the holders in the sorting positions. When they are held at an angle to the bottom of the tray slides held by the holders can be viewed as they are illuminated by ambient light. Because of the manner in which the slides are held they may be arranged in any desired manner by moving them to various position in the holders as they are illuminated.

2 Claims, 1 Drawing Sheet

U.S. Patent  Aug. 15, 1989  4,856,215
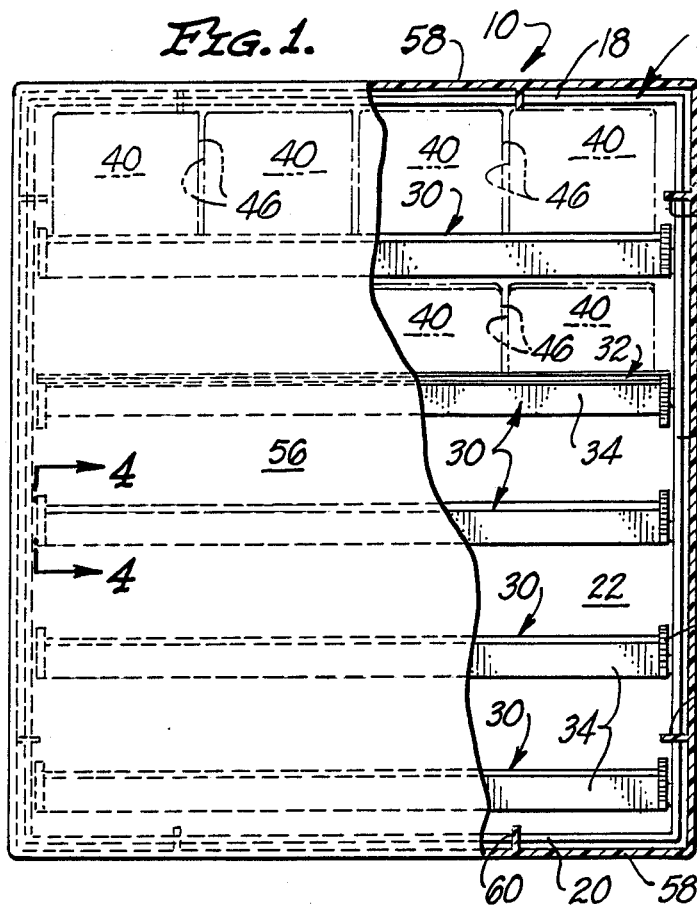
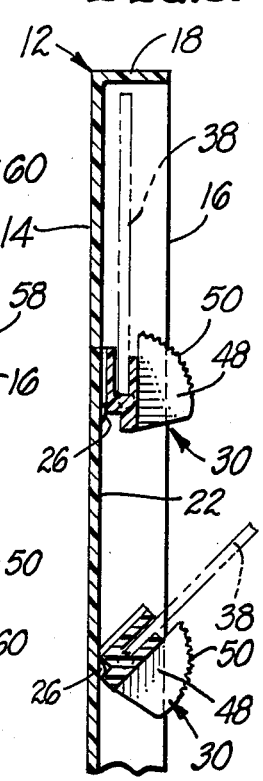
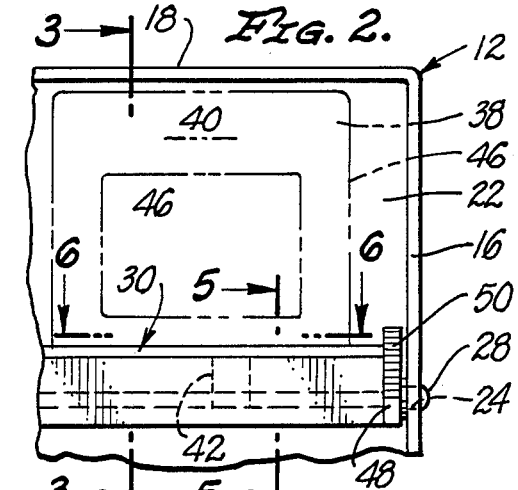
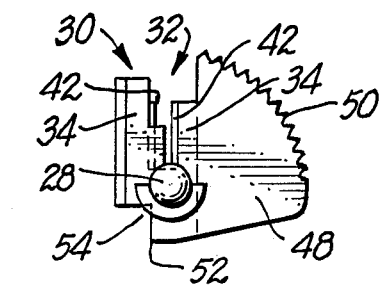
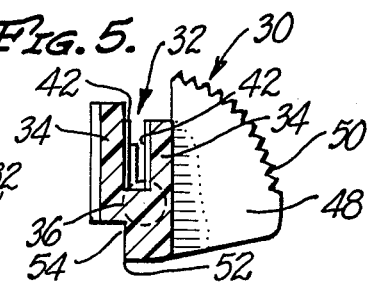
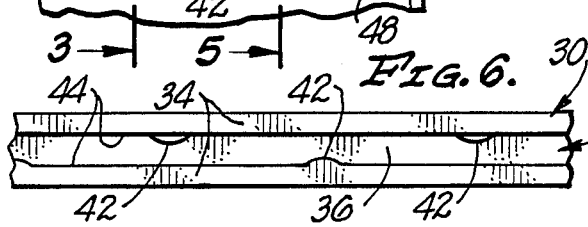

SLIDE SORTERS

This is a continuation of application Ser. No. 044,241 filed on Apr. 30, 1987 now abandoned.

BACKGROUND OF THE INVENTION

The invention set forth in this specification pertains to new and improved slide sorters for use in sorting photograph or similar slides so that they are place in a desired or intended sequence.

Frequently those who use photographic or similar slides need to be able to quickly and easily sort such slides so that at least some of a group of slides are placed in a desired sequence. Obviously such slides can be sorted in a variety of different manners.

In an extreme situation it is possible to sort them by holding individual slides so that they are held between an eye of a person doing the sorting and a source of light so that they are viewed as they are backlighted and then locating them in an intended sequence after they are viewed. This type of procedure is considered relatively undesirable for several different reasons. Frequently it is rather difficult to adaquately view a slide against a particular light source. Also it is frequently necessary to independently view different slides a series of times in order to get a series of slides in a desired sequence.

These same complications are encountered when back lighted hand held or similar slide viewers employing ambient illumination to illuminate a single slide at a time are used to facilitate the sorting of slides. The use of back lighted slide viewers incorporating a light source is considered to be an improvement over the use of viewers employing ambient light but is still disadvantageous as a consequence of the cost of using any illumination source. In addition, battery powered illumination is normally somewhat unsatisfactory for use in a slide sorter while the use of illumination powered by normal line current is rather undesirable in a slide sorter because of the fact that a slide sorter powered by a line current can only be used when it is possible to connect the sorter to a power line.

It is believed that both battery and line current have been used in the past to supply power to illuminate so called "light tables" so that the latter can be used in viewing and sorting a group of slides. Such tables are considered to be objectionable because of cost considerations and because of another important factor—portability. The sizes of such light tables usually precludes there being carried out about and used in virtually any sort of a desired location. Because of this, it is considered impractical to use even a relatively small desk top type of light table while traveling on an airplane so as to arrange slides in a desired sequence. Further, when a light table is used it is normally considered necessary to store slides sorted with such a table in a separate box or the like where they are held in such a manner that they cannot be readily inspected as they are used.

BRIEF SUMMARY OF THE INVENTION

As a result of these considerations it is believed that there is a need for new and improved sorters for use with photographic and similar or related slides. A broad object of the present invention is to provide slide sorters to satisfy or meet this need. A further object of the invention is to provide slide sorters as herein described which are of such a nature that they can be easily and conveniently used in virtually any desired illuminated location in sorting out the slides of a group of slides into a desired sequence.

An object of this invention is also to provide slide sorters as herein described which can be used to store or hold a sequence of slides in a desired order until and as they are used as, for example, in giving a lecture or as such a series of slides is transported from one location to another. In addition the invention is intended to provide slide sorters as indicated in the preceding discussion which can be easily and conveniently manufactured at a comparatively nominal cost and which are capable of being used extensively over prolonged periods with substantially little or no maintenance.

In accordance with this invention these various objectives of it are achieved by providing a device for use in sorting photogrphic slides, the device including at least: a bottom plate having an upper surface capable of reflecting ambient light, and holder means for use in holding a series of slides in such a manner the sequence of said slides can be changed in sorting said slides, said holder means being located at an angle to said upper surface such that when said upper surface is substantially horizontal normal ambient light will be reflected off of said upper surface in such a manner as to illuminate the backs of all of said slides held by said holding means.

BRIEF DESCRIPTION OF THE DRAWING

Because of the nature of this invention it is believed that it is best more fully described with reference to the accompanying drawing in which:

FIG. 1 is a top plan view of a presently preferred embodiment of a slide sorter of the present invention, the cover of this sorter shown being partially broken away to show the location and orientation of various holders as the complete sorter is used for storage purposes or to transport a series of slides;

FIG. 2 is a fragmentary view of the upper right hand corner of the sorter shown in FIG. 1 at an enlarged scale;

FIG. 3 is a partial cross-sectional view taken at line 3—3 of FIG. 2;

FIG. 4 is an end elevational view of a holder shown in FIG. 3 at an enlarged scale, this view corresponding to a cross-sectional view taken at line 4—4 of FIG. 1;

FIG. 5 is another cross-sectional view of a holder shown in FIG. 3 at an enlarged scale, this view corresponding to a cross-sectional view taken at line 5—5 for FIG. 2; and FIG. 6 is a partial cross-sectional view taken at line 6—6 of FIG. 2.

The particular slide sorter illustrated in drawing is constructed so as to utilize the concepts or principles of this invention as defined in the appended claims forming a part of this specification. These concepts or principles can be easily utilized in other somewhat differentily constructed or differently appearing devices through the use or exercise of routine mechanical engineering skill. For this reason this invention is to be considered to be limited only by these appended claims.

DETAILED DESCRIPTION OF THE PREFERRED EMBODIMENT

The slide sorter 10 illustrated in the drawings is constructed so as to include what may be referred to as a tray 12 having a flat bottom 14, parallel sides 16, a top 18 and a bottom 20. It is quite important with the invention that the upper surface 22 of the bottom 14 be of such a character that it will reflect any ambient light striking it when the sorter 10 is used. Preferably this surface 22 will not only be capable of reflecting ambient light but in addition will be capable of reflecting only diffused, white light.

Although such a preferred surface 22 can be achieved by providing a separate, known type of reflective coating (not shown) on the bottom 14 it is considered preferable from an economic standpoint to make the entire tray 12 of a self supporting, white, opaque polymer composition which is quite reflective in character, which is not absolutely smooth so that the light reflected by it will be diffused. Such a tray 12 can be easily manufactured by injection molding techniques at a comparatively nominal cost so as to include pairs (not separately numbered) of aligned holes 24 in the sides 16 and terminal detent bumps 26 on the bottom 20 adjacent to the sides 16.

These holes 24 are used so as to hold small aligned shafts 28 on individual holders 30 forming a part of the sorter 10. The particular sorter 10 shown utilizes five of these holders 30. It is to be understood that any desired number of them may be used so long as the number employed does not render the complete sorter so large that it is difficult to use. Each holder 30 includes an elongated body channel 32 having parallel side walls 34 joined by short bottom wall 36 so as to have a generally "U" shaped cross-sectional configuration as illustrated in FIGS. 3 to 6.

The walls 34 are normally located closely enough together so as to be capable of holding the border or frame 38 of a normal photographic or similar slide 40 between them in such a manner that a slide 40 can be easily pulled out of or inserted within the channel 32. Although the sorter 10 can be used without slides 40 held within the channels 32 being secured against accidental dislodgment from these channels 32 it is preferred to form the channels 32 so that such slides 40 are frictionally held. When they are so held, the sorter 10 can be moved about without danger of the slides 40 becoming dislodged. This holding action can be accomplished by locating the side walls 34 closely enough together so that they act as the arms of a spring type clip in holding slides 40.

However, it is considered preferable to achieve such a frictional holding action through the use of small ridges 42 on opposed surfaces 44 of the walls 34. These ridges 42 extend generally away from the bottom wall 36 and are located on the walls 34 so that any particular slide 40 is bowed very slightly between its side edges 46 as it is inserted into a channel 32. This develops a frictional holding force based upon the inherent resiliency of a slide 40 as well as upon the resiliency of a channel 32.

When a sorter 10 is manufactured as shown the holding force is of a character such that individual slides 40 can be easily inserted into and removed from the channels 32 or as the sorting progresses. If desired the slides 40 can be pushed along the lengths of these channels 32 during sorting. It is believed that different manufactures will probably want to vary the sorter 10 so that the manners in which the slides 40 are held will vary in accordance with their best judgement as to how firmly slides 40 should be held so that they will not be accidentally displaced from the channels 32 but can still be easily inserted and removed from these channels 32.

Each of the holders 30 preferably also includes a small terminal plate 48 serving more or less like a lever. Normally only a single plate 48 will be used with each holder 30 at the right hand side of such holder where it can conveniently be engaged by the right hand of a user of the sorter 10. If desired such a plate 48 may be located adjacent to each shaft 28 on a holder 30 so as to extend radially outwardly from it. This will accommodate the sorter 10 being used by both right and left handed individuals.

These plates 48 are all identical; they are shaped more or less like a gear sectors so as to each include a roughened arcuate edge 50 extending around a shaft 28. These edges 50 are used to facilitate these plates 48 being digitally engaged in rotating the holders. Extensions 52 on the plates 48 are employed so as to define notches 54 between the extensions and the bottom walls 36 on the adjacent channels 32. As best seen in FIG. 3 these notches 54 cooperate with the detent bumps 26 so as to position or hold the holders 30 at an angle of about 45° to the surface 22 when the sorter 10 is in use. Although an angle or 45° is preferred it is considered that acceptable results can be achieved with this angle is within the range of from about 30° to about 60°.

Together these notches 54 and the bumps 26 can be considered as "cooperating detent means" (not separately numbered) for positioning the holders 30 at an angle as indicated when the sorter 10 is used. During such use ambient light will normally be reflected off the surface 22 as diffused white light in such a manner that any slides 40 held by the holders 30 can be conveniently viewed. As they are viewed they can be easily moved about on the various holders 30 into any desired sequence. It is important to note that this sorting can be carried out in virtually any convenient location.

After such slides 40 have been sorted out the plates 48 can be conveniently engaged so as to be rotated in such a manner that the channels 32 extend parallel to the bottom 14 of the tray 12. In this position of these channels 32 the slides 40 held within them also extend parallel to the bottom 14 and both such slides 40 and the channels 32 are generally within the tray 12. At this point the tray 12 may be conveniently moved about or stored. It is preferred to cover it with a common cover or lid 56 as indicated in FIG. 1 when it is to be stored or moved. The lid 56 preferably includes side walls 58 which extend adjacent to the sides 16, the top 18 and the bottom 20 as well as tapered internal members 60 which can be shaped so as to frictionally hold the lid 56 in place by engaging the sides 16, the top 18, and the bottom 20 of the tray 12.

I claim:

1. A device for use in sorting photographic slides, said device including:
    a tray formed of self-supporting, white, opaque light reflective polymer composition, said tray having a bottom plate which has an upper surface and a peripheral wall extending around and upwardly from said bottom plate, said peripheral wall including parallel side walls and aligned holes in said side walls;
    holding means for use in holding a series of slides in such a manner that the sequence of said slides can be changed in sorting said slides;
        said holding means including a generally U-shaped channel adapted to receive said slides so as to hold said slides, said channel being shaped so that the frames of said slides will fit within said channel so as to be held thereby;

said holding means also including aligned shafts at the extremities of said channel and fitting within said holes, said shafts serving as a mounting means pivotally mounting said holding means relative to said bottom plate in a position in which it extends transverse to said side walls so that said mounting means can be rotated about an axis extending parallel to said support surface and including coacting detent means located on said tray and on said holding means for securing said holding means in either a position in which any slides held by said holding means are at an angle of from about 30 degrees to about 60 degrees to said upper surface or a position in which any slides held by said holding means are parallel to said upper surface located on said holding means and on said tray; and lever means attached to said holding means for use in rotating said holding means, said upper surface serving to reflect diffused ambient light towards the backs of any slides held by said holding means at an angle to said upper surface so that said slides may be conveniently viewed and sorted.

2. A device as claimed in claim 1 wherein:

said channel includes a plurality of internal projections located on the opposed internal side walls of said channel, said projections being spaced from one another and positioned so that the frames of said slides can be slightly distorted from their normal configuration so as to be slightly bowed when inserted in said channel and so that the inherent resiliency of said frames causes said frames to tend to return to their original configuration whereby said frames will resiliently engage said projections so as to hold said slides within said channel while still allowing sliding movement of said slides within said channel.

* * * * *